United States Patent
Tanioka et al.

(10) Patent No.: US 7,407,464 B2
(45) Date of Patent: Aug. 5, 2008

(54) ENGINE START CONTROL SYSTEM

(75) Inventors: Hiromitsu Tanioka, Anjo (JP); Toshiya Honda, Okazaki (JP); Jun Ito, Toyota (JP)

(73) Assignees: Denso Corporation (JP); Toyota Jidosha Kabushiki Kaisha (JP)

(*) Notice: Subject to any disclaimer, the term of this patent is extended or adjusted under 35 U.S.C. 154(b) by 294 days.

(21) Appl. No.: 11/430,279

(22) Filed: May 9, 2006

(65) Prior Publication Data
US 2006/0258508 A1  Nov. 16, 2006

(30) Foreign Application Priority Data
May 10, 2005 (JP) .............................. 2005-137809

(51) Int. Cl.
*B60W 10/04* (2006.01)
*B60W 10/18* (2006.01)
*F02N 17/00* (2006.01)

(52) U.S. Cl. .................................... 477/203; 123/179.2

(58) Field of Classification Search ................. 477/203, 477/906; 123/179.2, 179.3, 179.24
See application file for complete search history.

(56) References Cited

U.S. PATENT DOCUMENTS 7,199,710 B2 *  4/2007  Hiramitsu et al. ...... 340/539.26
7,216,616 B2 *  5/2007  Asada et al. ............. 123/179.3
2004/0212252 A1  10/2004  Ohtaki et al.
2007/0261653 A1 * 11/2007  Yagyu ...................... 123/179.2

FOREIGN PATENT DOCUMENTS

| DE | 102 34 083 | 2/2004 |
|---|---|---|
| GB | 2 317 660 | 4/1998 |
| JP | 64-12926 | 1/1989 |
| JP | 2001-336329 | 12/2001 |
| JP | 2003-301764 | 10/2003 |
| JP | 2004-324469 | 11/2004 |
| JP | 2006283727 A * | 10/2006 |
| JP | 2007023919 A * | 2/2007 |

OTHER PUBLICATIONS

Office Action dated Jan. 28, 2008 in the DE application No. 10 2006 021 604.0 with English translation.

* cited by examiner

*Primary Examiner*—Tisha D Lewis
(74) *Attorney, Agent, or Firm*—Nixon Vanderhye PC

(57) ABSTRACT

An engine start control unit enables engine start when a user performs a predetermined normal time push operation on a push switch in a normal mode. The engine start control unit enables the engine start when the user performs a predetermined fail-safe push operation on the push switch in a fail-safe mode. The fail-safe push operation of the push switch requires an increased work load of the user in comparison to that of the normal time push operation of the push switch.

13 Claims, 9 Drawing Sheets

ENGINE START CONTROL SYSTEM

CROSS REFERENCE TO RELATED APPLICATION

This application is based on and incorporates herein by reference Japanese Patent Application No. 2005-137809 filed on May 10, 2005.

BACKGROUND OF THE INVENTION

1. Field of the Invention

The present invention relates to an engine start control system.

2. Description of Related Art

Recently, vehicles, which have a system that enables engine start without using a key, are well marketed. For example, in a system called as "Smart Entry & Push Start System", unlocking of a vehicle door and authenticating of an ID are performed through radio communication between a portable radio communication device, which is carried by a user, and a radio communication device (a transmitter and receiver device) of the vehicle. When the user gets into the vehicle and pushes a push switch of the vehicle while depressing a brake pedal, the engine is started. In this case, as shown in FIG. 12 of Japanese Unexamined Patent Publication No. 2004-324469, when a detection signal, which indicates detection of depression of the brake pedal, is absent, i.e., when the brake pedal is not depressed in the normal time, the engine is not started even upon depression, i.e., push of the push switch. This is implemented by the engine start control flow disclosed in Japanese Unexamined Patent Publication No. 2004-324469.

In the above push switch type engine start system, an output of a brake sensor (e.g., a switch for lighting a stop lamp of the vehicle), which detects the depression of the brake pedal, is often used as the detection signal that indicates the detection of the depression of the brake pedal. However, in a case where the brake sensor or its wiring fails, even when the brake pedal is depressed, the detection signal is not outputted from the brake sensor, so that the engine cannot be started through use of the push switch.

Furthermore, many vehicles have a mechanism, in which a brake booster is provided in a hydraulic circuit of a brake system to assist a brake pedal operation of a driver and thereby to increase the applied force, which is applied onto the brake pedal. In one exemplary case, the assist power of the brake booster uses a negative suction force, which is generated in an intake manifold of the engine. When the engine is stopped, the remaining negative pressure, which remains in the brake booster, gradually leaks, so that the substantial assist force cannot be made. The leakage of the negative suction force is increased when the brake pedal is repeatedly depressed by the driver. As a result of the pressure leakage, the brake pedal becomes stiff, i.e., becomes difficult to depress in comparison to the normal time, at which the brake pedal can be easily depressed by the foot of the driver to start the engine. Thus, even when a relatively large force is applied from the foot of the driver onto the brake pedal, the brake pedal cannot be depressed to a predetermined stroke, at which the brake switch is urged by the brake pedal to output the detection signal. Therefore, even when the brake switch is normal, the engine cannot be started.

A fail-safe mechanism of the brake switch against burnout, breakage of wiring or any other failure of the brake switch has not been implemented or considered since the brake switch has not been in cooperation with a main part of the engine start electronic system and has been previously used only as a switch for lighting the stop lamp of the vehicle. However, the disablement of the engine start poses serious problems to the user. Specifically, when the engine cannot be started, the user cannot drive the vehicle to an automobile dealer or a repair shop and also cannot operate an air conditioner of the vehicle. In an extreme case, the vehicle needs to be towed by a wrecker car.

SUMMARY OF THE INVENTION

Therefore, it is an objective of the present invention to provide an engine start control system, which starts an engine upon operation of a push switch while depressing a brake pedal and which implements a fail-safe that enables engine start even in a case where the depression of the brake pedal cannot be detected upon the depression of the brake peal due to some reason.

To achieve the objective of the present invention, there is provided an engine start control system for an internal combustion engine of a vehicle. The engine start control system includes a push switch, a brake sensor and an engine start control unit. The push switch is pressable by a user to start the engine. The brake sensor senses depression of a brake pedal of the vehicle when the user depresses the brake pedal a predetermined distance or greater from an initial point. The engine start control unit controls engine start of the engine. The engine start control unit determines that a current operational mode is a normal mode when the brake sensor detects the depression of the brake pedal and is thereby placed in an detected state. The engine start control unit enables the engine start when the user performs a predetermined normal time push operation on the push switch in the normal mode. The engine start control unit determines that the current operational mode is a fail-safe mode when the brake sensor does not detect the depression of the brake pedal and is thereby placed in an undetected state. The engine start control unit enables the engine start when the user performs a predetermined fail-safe push operation on the push switch in the fail-safe mode. The fail-safe push operation of the push switch requires an increased work load of the user in comparison to that of the normal time push operation of the push switch.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
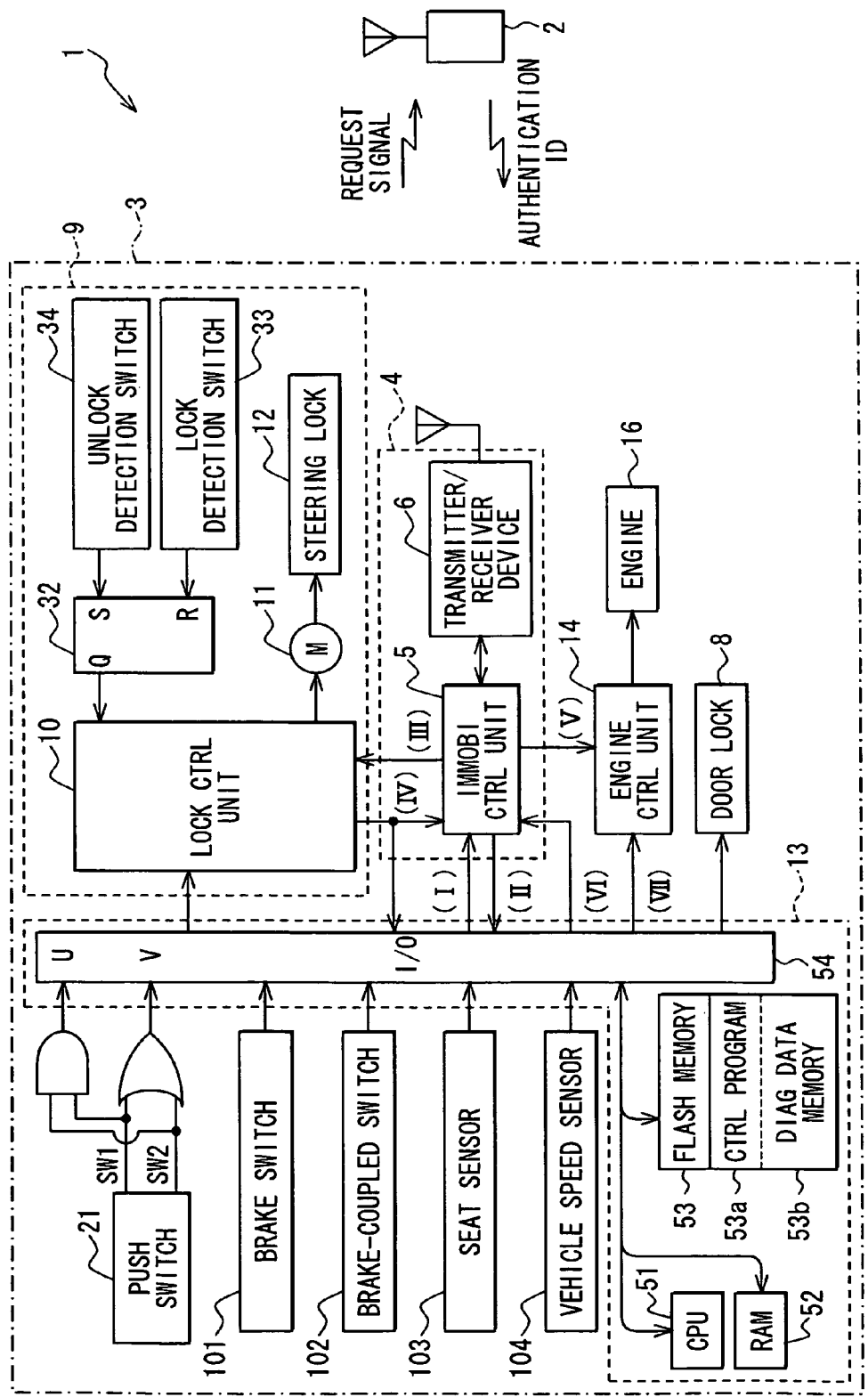
FIG. 1 is a block diagram showing an engine start control system according to an embodiment of the present invention.

FIG. 1 shows an electrical structure of an engine start control system 1 according to the present embodiment. The engine start control system 1 includes a push switch 21 and a brake sensor (also referred to as a brake switch) 101. A user (a driver) pushes the push switch 21 to start, i.e., crank an internal combustion engine (hereinafter, simply referred to as an engine) 16. The brake sensor 101 detects depression of a brake pedal 201 (FIG. 10) when the user depresses the brake pedal 201 by an amount equal to or greater than a predetermined stroke (a predetermined distance from an initial point), i.e., a predetermined amount. The engine start control system 1 further includes an engine start control unit 13. In a detected state of the brake sensor 101, i.e., in the state where the depression of the brake pedal 201 by the user is detected through the brake sensor 101, an operational mode is a normal mode. Thus, the engine start control unit 13 enables the engine start when the user performs a predetermined normal time push operation on the push switch 21 by pushing the push switch 21 in a normal manner. In contrast, in an undetected state of the brake sensor 101, i.e., the state where the depression of the brake pedal 201 is not detected by the sensor 101, the operational mode is a fail-safe mode. In the fail-safe mode, the engine start control unit 13 enables the engine start only when the user performs a predetermined fail-safe push operation on the push switch 21. In this instance, the fail-safe push operation requires an increased work load of the user in comparison to that of the normal time push operation at the time of pushing the push switch 21.

At the time of performing the normal time push operation on the push switch 21 in the state where the brake pedal 201 is depressed, when the brake sensor 101 becomes inoperable due to malfunctioning of some kind, the engine start is disabled. However, in the engine start control system 1, even under such a situation, when the predetermined fail-safe push operation is performed on the push switch 21, the start of the engine 16 is enabled through operational control of corresponding parts by the engine start control unit 13.

Specifically, the engine start control system 1 further includes a portable radio communication device (a smart key or a security key) 2 and a controller 4. The portable radio communication device 2 can be freely carried by the user. The controller 4 is installed in a vehicle (an automobile) 3. The controller 4 includes an immobilization control unit (also referred to as an immobi control unit) 5 and a transmitter and receiver device 6. The immobilization control unit 5 intermittently outputs a request signal through the transmitter and receiver device 6 to an interior of a vehicle passenger compartment. When the portable radio communication device 2 is brought into a predetermined region in the passenger compartment and receives the request signal, an authentication ID of the portable radio communication device 2 is automatically transmitted from the portable radio communication device 2 to the vehicle 3 side (specifically, the transmitter and receiver device 6) through the radio communication.

In the present embodiment, the engine start control unit 13 is a power supply control unit (hereinafter, also referred to as a power supply control unit 13) and is connected with an engine control unit 14 and a steering lock apparatus 9. The engine control unit 14 controls, for example, fuel injection and engine ignition of the engine 16. The steering lock apparatus 9 locks rotation of a steering shaft at the time of engine stop. The steering lock apparatus 9 includes a lock control unit 10, a steering lock motor (serving as an actuator) 11 and a known mechanical steering lock mechanism (or simply referred to as a steering lock) 12. The immobilization control unit 5 receives the authentication ID from the portable radio communication device 2 through the transmitter and receiver device 6. Then, the immobilization control unit 5 verifies whether the received authentication ID of the portable radio communication device 2 matches with a pre-registered maser ID, which has been pre-registered in the vehicle 3, i.e., which is stored in a verification memory (not shown) of the vehicle 3. Then, the immobilization control unit 5 unlocks a door lock 8 by driving a door lock motor when the received authentication ID of the portable radio communication device 2 matches with the pre-registered master ID. In the unlocked state of the door lock 8, when the immobilization control unit 5 no longer receives the authentication ID from the portable radio communication device 2, the immobilization control unit 5 drives the door lock motor to lock the door lock 8. Thus, when the user having the valid portable radio communication device 2 approaches the vehicle 3, the door lock 8 is automatically unlocked. In contrast, when the user leaves the vehicle 3, the door lock 8 is automatically locked. Each of the immobilization control unit 5, the lock control unit 10, the power supply control unit 13 and the engine control unit 14 is in a form of an ECU that includes a known computer hardware, to which a CPU, a ROM, a RAM and an input/output device (I/O port) are connected through a bus-line, and these ECUs are interconnected through a network.

The power supply control unit (the engine start control unit) 13 includes the CPU 51, the RAM 52, the flash memory 53 and the input/output device 54, which are interconnected through the bus-line. The CPU 51 executes a control program 53a, which is stored in the flash memory 53, to implement basic functions of the engine start control unit 13 while the RAM 52 is used as a work area. A diagnostic data memory (a diagnostic data storage) 53b is formed in the flash memory 53.

Figure 10:
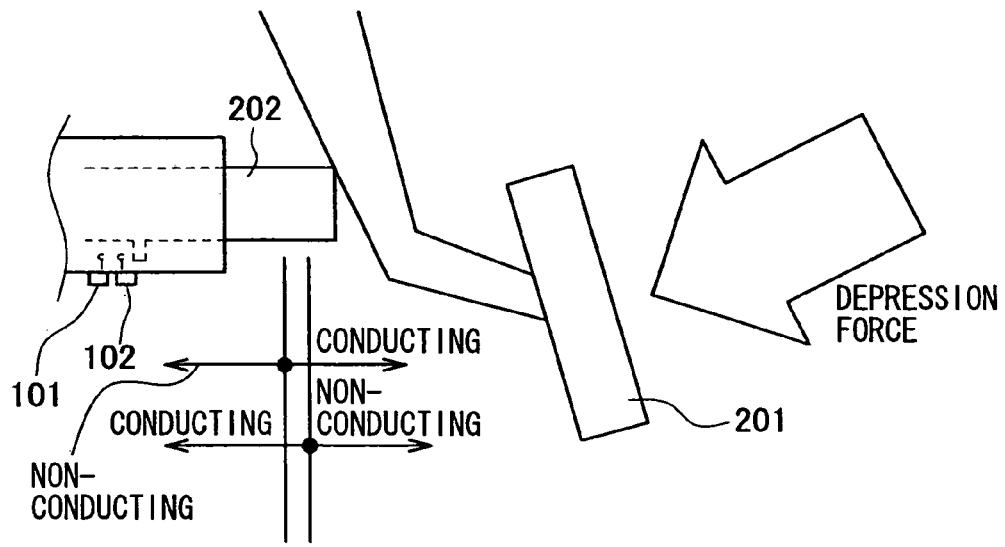
FIG. 10 is a descriptive view showing a depression stroke of a brake pedal, an operational state of a brake switch and an operational state of a brake-coupled switch.
Figure 11:
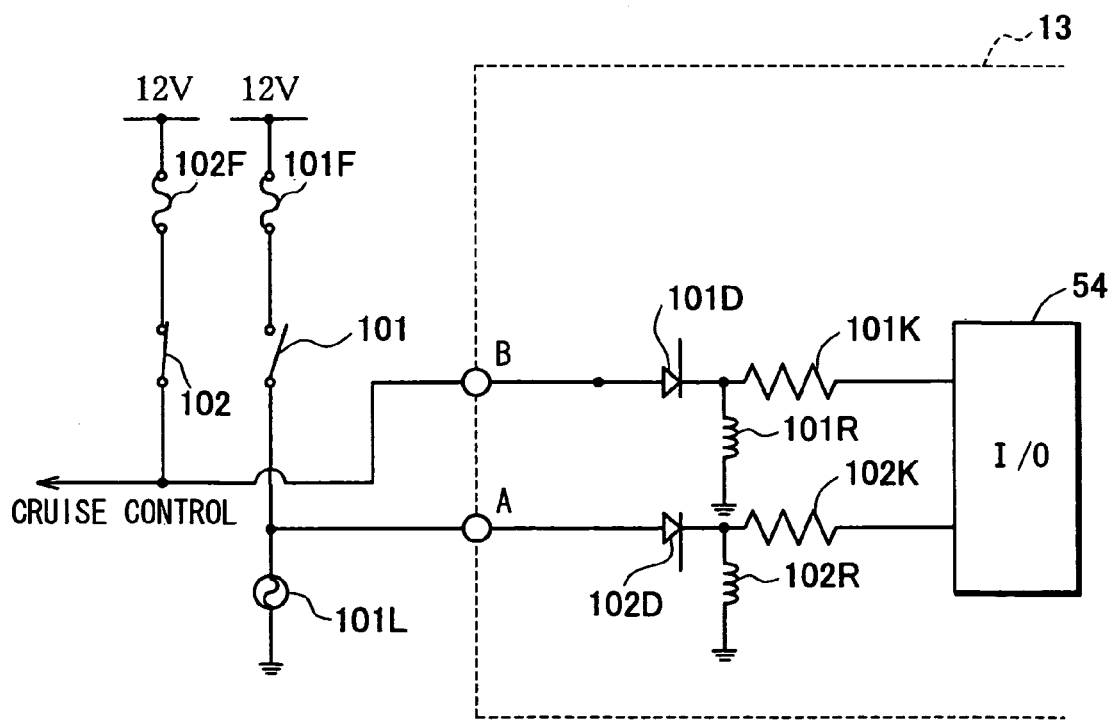
FIG. 11 is a diagram showing an example of a detected signal input circuit of the brake switch and the brake-coupled switch.

The push switch 21, which is used to start the engine 16, is connected to the input/output device 54 of the power supply control unit 13. The push switch 21 is located within arm's reach of a driver (e.g., at a side of a cockpit panel) in the passenger compartment. The input/output device 54 is connected to the brake switch (the brake sensor) 101, a brake-coupled switch (also referred to as a brake-coupled sensor or a cruise control switch) 102, a seat sensor (also referred to as a seat occupant sensor that senses an occupant on a vehicle seat) 103 and a vehicle speed sensor 104. As shown in FIG. 10, the brake switch 101 is normally placed in an off-state (a non-conducting state). When the brake pedal 201 is depressed by the amount equal to or greater than the predetermined stroke (the predetermined distance), the brake switch 101 is placed in an on-state (a conducting state) to conduct electric current and thereby to lit a stop lamp 101L (FIG. 11). Furthermore, in the present embodiment, the brake-coupled switch 102 also serves as a cruise control switch, which outputs a release trigger for canceling a constant speed traveling control operation (i.e., a cruise control operation) of the vehicle.

Figure 12:
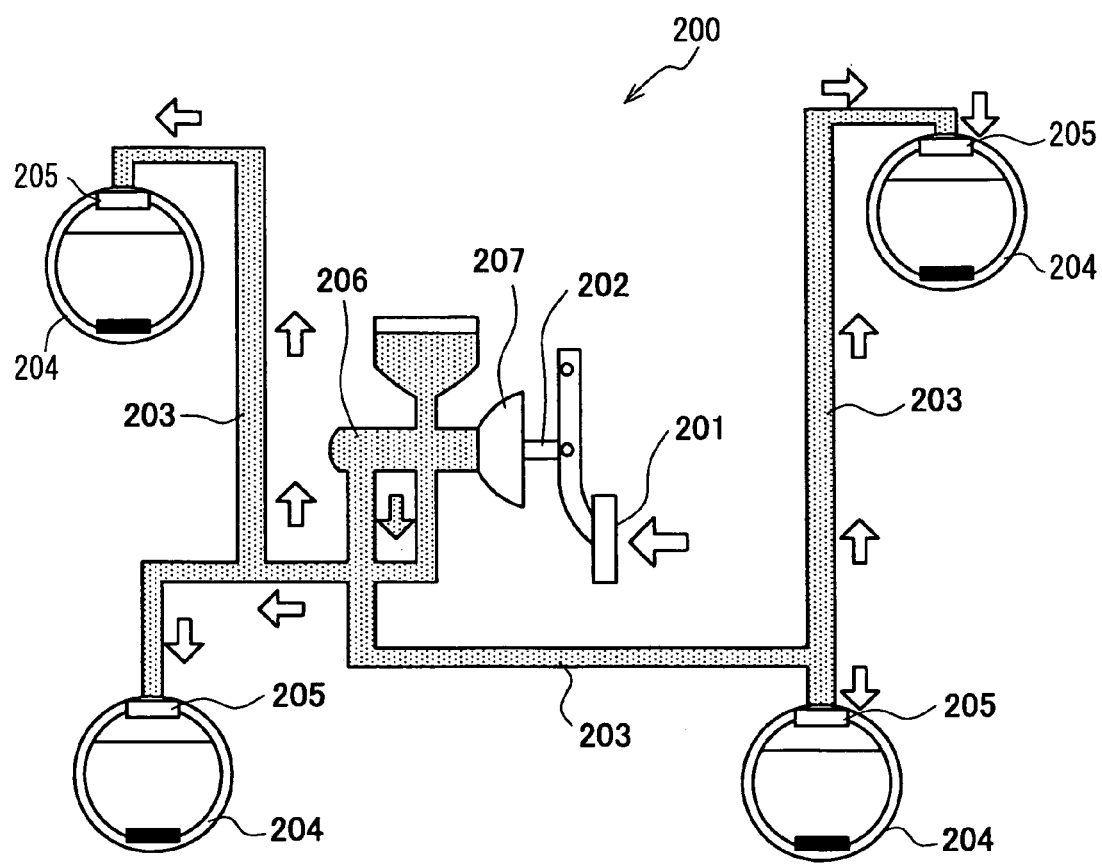
FIG. 12 is a diagram schematically showing a vehicle hydraulic brake mechanism.

The vehicle 3 of FIG. 1 includes a hydraulic brake system, such as a hydraulic brake system 200 shown in FIG. 12. In the brake system 200, the hydraulic pressure of a master cylinder 206 is supplied to a wheel cylinder 205 of a brake 204 of each wheel of the vehicle 3 through a brake pipe (a brake fluid passage) 203. The applied force on the brake pedal 201 is amplified via a brake booster 207 through use of a negative suction pressure of the engine 16 and is transmitted to the master cylinder 206.

Figure 13A:
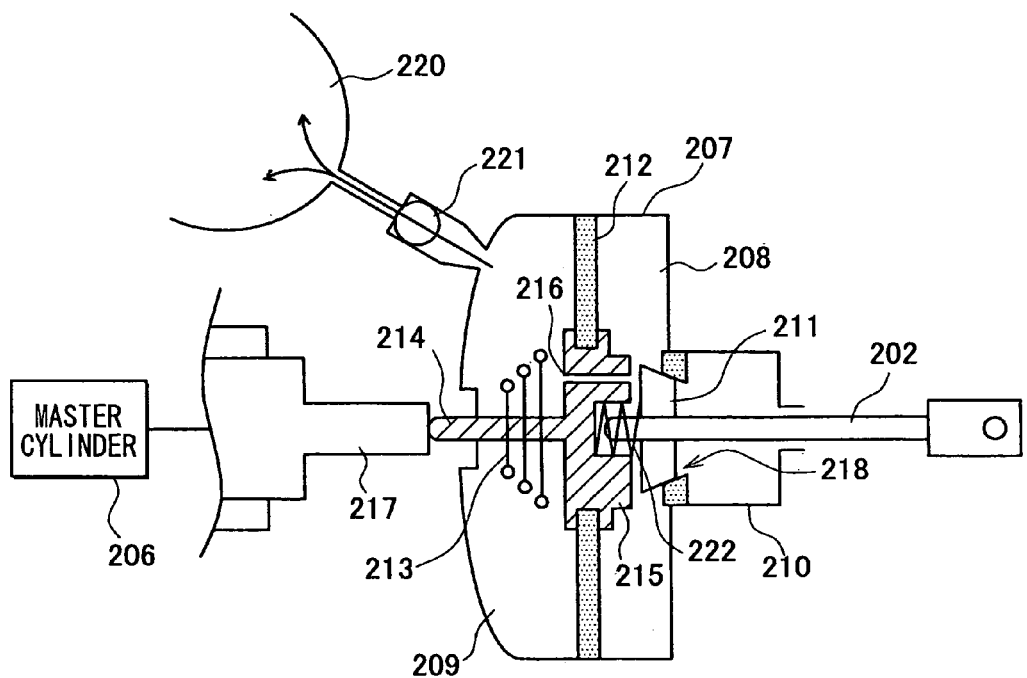
FIG. 13A is a descriptive view showing one operational state of a brake booster.
Figure 13B:
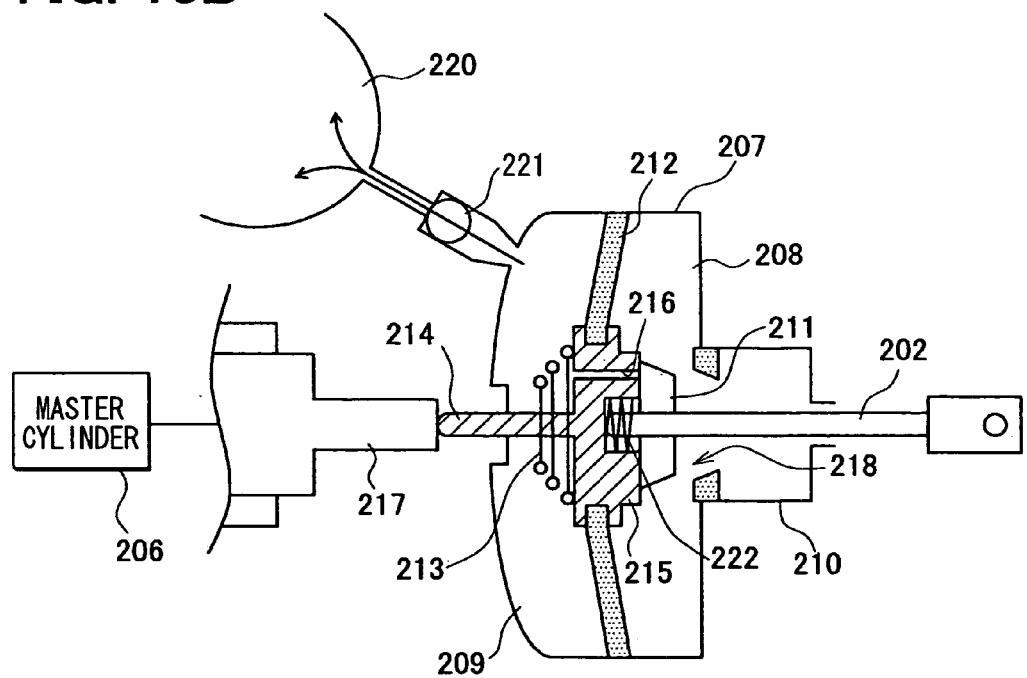
FIG. 13B is a descriptive view showing another operational state of the brake booster.

FIGS. 13A and 13B are diagrams for describing an operation of the brake booster 207. A diaphragm 212 and a diaphragm support plate 215 are placed in an interior of the brake booster 207. The diaphragm 212 is made of an elastic material, such as rubber. The diaphragm support plate 215 supports the diaphragm 212. The interior of the brake booster 207 is divided into a first chamber 209 and a second chamber 208 by the diaphragm 212 and the diaphragm support plate 215. An intake manifold 220 of the engine 16 (FIG. 1) is communicated with the first chamber 209 through a check valve 221. The negative pressure, which is exerted in the intake manifold 220, suctions the air in the first chamber 209. The atmospheric air can be supplied to the second chamber 208 from an atmospheric air intake chamber 210, which is formed integrally with the second chamber 208, through a first communication hole 218. A distal end portion (a left end in FIG. 13A or 13B) of an operating rod 202, which is driven forward and backward by the brake pedal 201, is received in the second chamber 208 through the atmospheric air intake chamber 210 to drive the diaphragm support plate 215 forward and backward.

A push rod 214 is formed integrally with the diaphragm support plate 215. The push rod 214 contacts a piston rod 217 of the master cylinder 206 to drive the piston rod 217 forward and backward. Furthermore, the diaphragm support plate 215 is resiliently urged toward the second chamber 208 by a backup spring 213, which is arranged in the first chamber 209. A second communication hole 216 is formed in the diaphragm support plate 215 to communicate between the first chamber 209 and the second chamber 208. A valve member 211 is provided in an axial intermediate portion of the operating rod 202. The valve member 211 closes the second communication hole 216 when the operating rod 202 is moved forward through depression of the brake pedal 201. Furthermore, the valve member 211 closes the first communication hole 218 when the operating rod 202 is moved backward through release of the depression of the brake pedal 201. The valve member 211 is normally urged by a valve return spring 222 to close the first communication hole 218.

In the running state of the engine 16, when the brake pedal 201 is depressed, the operating rod 202 is moved forward together with the valve member 211 against the resilient force of the valve return spring 222, as shown in FIG. 13B. Therefore, the second communication hole 216 is closed, and the first communication hole 218 is opened. Thus, the atmospheric air is supplied into the second chamber 208. As a result, a pressure difference is developed on the opposite sides of the diaphragm 212 between the atmospheric pressure in the second chamber 208 and the negative suction pressure in the first chamber 209. This pressure difference generates an assist force to double the pressing force, which is applied from the brake pedal 201 to the operating rod 202.

Furthermore, in the running state of the engine 16, when the depression of the brake pedal 201 is released, the valve member 211 is pushed backward by the valve return spring 222 to close the first communication hole 218 and to open the second communication hole 216, as shown in FIG. 13A. Then, the air in the first chamber 209 is suctioned by the negative pressure of the intake manifold 220, and the air in the second chamber 208 is also suctioned through the second communication hole 216 to cause development of a negative pressure in the second chamber 208. Therefore, equal pressure is developed on each of the opposite sides of the diaphragm 212. As a result, the diaphragm support plate 215 is pushed backward together with the operating rod 202 by the backup spring 213.

When the engine 16 stops, the negative pressure in the intake manifold 220 is maintained for a while, so that the brake assist effect of the brake booster 207 is maintained even in the stop period of the engine 16. Thus, the pressing operation of the brake pedal 201 at the time of the engine start can be performed without any trouble as long as the remaining negative pressure is appropriately supplied to the brake booster 207. Here, it should be understood that the engine 16 has been stopped before the time of the engine start. The remaining negative pressure gradually leaks with the elapse of time. Thus, when a relatively long period of time elapses since the time of stopping the engine 16, the sufficient negative pressure is no longer supplied to the brake booster 207. Therefore, the assist power is lost. As a result, when the brake pedal 201 needs to be depressed for the same stroke (the same amount), the applied force for depressing the brake pedal 201 needs to be doubled in comparison to the normal operational period. Specifically, when the pressing operation of the brake pedal 201 is repeated in the engine stop period, as shown in FIG. 13B, the atmospheric pressure in the second chamber 208 is drawn into the intake manifold side every time the brake pedal 201 is depressed. Thus, the loss of the remaining negative pressure proceeds quickly.

As described above, when the assist force of the brake booster 207 is reduced due to the leakage of the remaining negative pressure in the engine stop period, the force applied from the foot of the driver to the brake pedal 201 to depress the brake pedal 201 to the predetermined stroke becomes insufficient. In this state, even when the brake pedal 201 is depressed by the foot of the driver with a relatively large force, the brake switch (sensor) 101 (FIG. 1) cannot be placed in the detected state, at which the depression of the brake pedal 201 is detected by the brake switch (sensor) 101. Therefore, at this time, even when the push switch 21 is operated in the normal manner by the normal time push operation, the engine 16 cannot be started. Thus, in the above case where the required depression stroke of the brake pedal 201 cannot be achieved by the applied force of the user alone, thereby resulting in the undetected state of the brake switch 101, the power supply control unit (the engine start control unit) 13 enables the engine start upon execution of the fail-safe push operation, which requires the user to apply the increased force (the increased work load) that overcomes the increased operational load of the push switch 21 larger than that of the normal time push operation.

In the above case, the brake switch 101 and its peripheral system have no particular trouble, and it is the operational system of the brake pedal 201 (the mechanical urging system of the brake switch 101) that has the malfunction. Besides this case, there is another exemplary case where the engine start through the normal time push operation is disabled. That is, even when the brake pedal 201 is depressed to the predetermined stroke, the brake switch 101 itself (including the wiring to its peripheral devices) may have a malfunction. In such a case, the brake switch 101 is held in the undetected state, and therefore the engine start is disabled. In this case too, the power supply control unit (the engine start control unit) 13 enables the engine start through the fail-safe push operation. This will be described in detail below.

As shown in FIG. 11, the brake switch 101 is a switch, which is turned on to lit, i.e., light the stop lamp 101L when the brake pedal 201 is depressed. In the present embodiment, the stop lamp 101L is connected to a power source (12V, i.e., a vehicle battery voltage) through the switch 101 and a fuse 101F. A detection signal (A), which indicates a conducting state of the switch 101, is supplied from a point between the switch 101 and the lamp 101L to the input/output device 54 of the power supply control unit 13 through a backflow prevention diode 102D, an input impedance adjusting resistor 102K and a pull-down resistor 102R. The pull-down resistor 102R stabilizes an input electrical potential at the time of burnout (brakeage) of a bulb of the stop lamp 101L.

The detection signal (A) becomes high (Hi) when the brake pedal 201 is depressed to place the switch 101 into the normal conducting state. At this time, when the normal time push operation is performed on the push switch 21 of FIG. 1, the engine 16 is started. The input of the detection signal (A) becomes low (Lo) in each of the following three cases. In each of the following three cases, when the fail-safe push operation is performed on the push switch 21, the engine 16 is started. In a first case, the detection signal (A) becomes Lo when the switch 101 is placed in a non-conducting state (an open state). When the brake pedal 201 is not depressed or is depressed insufficiently due to the shortage of the negative pressure described above, the predetermined stroke of the brake pedal 201 is not achieved, so that the switch 101 is not turned on. In a second case, the detection signal (A) becomes Lo when breaking of the wiring (also referred to as a wiring path) of the brake switch 101 occurs. In a third case, the detection signal (A) becomes Lo when breaking of the fuse 101F installed in the wiring path occurs. In each of the above three cases, when the engine 16 is started in the fail-safe mode, a history (including time and date) of the fail-safe push operation is recorded in the diagnostic data memory 53b of FIG. 1 as the diagnostic data.

As shown in FIG. 1, the push switch 21 includes a plurality of sub-switches SW1, SW2. Each of the sub-switches SW1, SW2 is configured such that the depressed state and the non-depressed state of the sub-switch SW1, SW2 correspond to the conducting state and the non-conducting state of the sub-switch SW1, SW2. In this case, under the normal mode, the power supply control unit (the engine start control unit) 13 enables the engine start when at least one of the sub-switches SW1, SW2 is placed in the conducting state, which indicates the depressed state. In contrast, under the fail-safe mode, the power supply control unit (the engine control unit) 13 enables the engine start only when both of the sub-switches SW1, SW2 are placed in the conducting state, which indicates the depressed state. In this type of the push switch 21, the engine start is enabled under the fail-safe mode only when the sub-switches SW1, SW2 are all urged, i.e., are all depressed. Thus, erroneous engine start, which is caused by, for example, a failure in a switch contact point, can be advantageously limited.

In the present embodiment, the number of the sub-switches is two. A logical sum of output signals of the sub-switches SW1, SW2 is supplied to a port V of the input/output device 54. Also, a logical product of the output signals of the sub-switches SW1, SW2 is supplied to a port U of the input/output device 54. In the normal mode, the input signal of the port V is read as the operational signal of the push switch 21. In contrast, in the fail-safe mode, the input signal of the port U is read as the operational signal of the push switch 21.

Figure 2A:
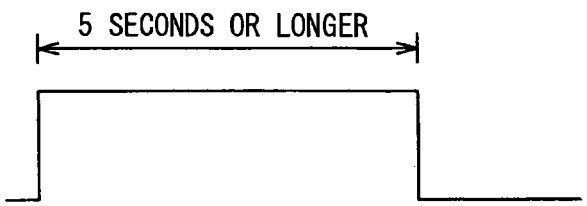
FIG. 2A is a timing chart showing a first example of an input pattern of a fail-safe push operation.

An operational sequence of the push switch 21 in the normal mode and the fail-safe mode can be distinguished in various ways, as described below. As shown in FIG. 2A, in the fail-safe mode, the fail-safe push operation performed on the push switch 21 can be implemented as a continuous depression operation (a long period depression), in which the engine start is enabled when the depressed state of the push switch 21 is maintained for a predetermined time period or longer (e.g., 5 seconds or longer). In contrast, in the normal mode, the engine start is enabled even when the duration of the depressed state of the push switch 21 is less than the above predetermined time period. Many people tend to depress the switch for a period of, for example, 2 seconds or less. However, if an extremely short depression time period is accepted as the required depression time period for the normal mode, an erroneous engine start could be initiated by a noise signal. Thus, a minimum depression time period for starting the engine 16 in the normal mode may be set to equal to or longer than 0.5 seconds. That is, in the normal mode, the engine start is enabled even when the push switch 21 is depressed for the short time period (e.g., 0.5 seconds or longer). In the fail-safe mode, the engine start is enabled only when the long period depression (e.g., 5 seconds or longer) of the push switch 21 is performed.

Figure 2B:
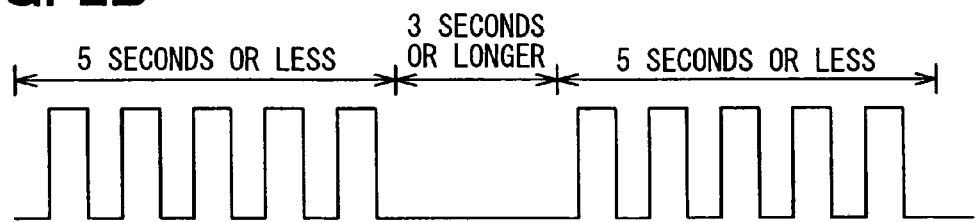
FIG. 2B is a timing chart showing a second example of the input pattern of the fail-safe push operation.

In another example, as shown in FIG. 2B, in the fail-safe mode, the fail-safe push operation performed on the push switch 21 can be implemented as a patterned depression operation, in which the engine start is enabled when a predetermined pattern of the depressed period and the following non-depressed period of the push switch 21 is inputted through the push switch 21. Specifically, in the normal mode, the engine start is enabled when a single depression operation (serving as the normal time push operation), in which the push switch 21 is operated, i.e., is depressed only once (a single time), is performed. In the fail-safe mode, the engine start is enabled when a repeated multiple depression operation (serving as the fail-safe push operation), in which the push switch 21 is repeatedly operated, i.e., is depressed a predetermined number of times, is performed. Like in the fail-safe mode implemented by the long period depression operation, it is clearly distinguishable between the normal time push operation, which requires only the single depression of the push switch 21, and the fail-safe push operation, which requires the multiple depressions of the push switch 21. Furthermore, many people have a tendency to repeatedly depress the push switch 21 when the first depression of the push switch 21 results in a failure of the engine start. In view of the above psychological tendency, like in the long period depression of the push switch 21, the user can easily recall that it is the fail-safe push operation while depressing the push switch 21 multiple times.

However, when the engine 16 is started through the simple multiple depressions of the push switch 21, the user may not sometimes realize that it is the fail-safe push operation, i.e., it is the abnormal situation. In view of the above fact, in FIG. 2B, the fail-safe push operation is executed by alternately implementing a repeatedly operating period for repeatedly operating the push switch 21 a predetermined number of times and then followed by a non-operating period, which is longer than an interval between the operations (depressions) of the push switch 21. In this case, the repeated depressions of the switch (the repeatedly operating period) for repeatedly depressing the switch the predetermined number of times needs to be repeated with the predetermined interval (the non-operating period). In this way, the user can more easily notice the abnormal situation. Here, the predetermined number of times may possibly be any number equal to or greater than a specific number of times or may alternatively be exactly the specific number of times. Although the specific number of times is more desirable as the predetermined number of times for a security reason, people tend to forget the specific number of times, resulting in a trouble.

Next, the power supply control unit (the engine start control unit) 13 of FIG. 1 may be constructed to enable the engine start through the normal time push operation even in the undetected state of the brake switch (sensor) 101 as long as the brake-coupled switch (sensor) 102 detects the depression of the brake pedal 201 upon the brake pedal 201 being depressed a preset stroke (a preset distance from the initial point). In such a case where the backup brake sensor 101 is in the undetected state, and the brake-coupled sensor 102 senses the depression of the brake pedal 201 (FIG. 10). i.e., is in the detected state, when the engine start is enabled through the normal time push operation, the operational history of this operation is stored as diagnostic data in the diagnostic data memory 53b.

As described above, the brake-coupled switch 102 is the cruise control switch in the present embodiment. As shown in FIG. 10, the cruise control switch 102 is normally turned on (conducting state). Even when the brake pedal 201 is depressed slightly, the constant speed travel control is interrupted. The preset depression stroke (the preset depressed amount or distance from the initial point) of the brake pedal 201, which causes turning off (non-conducting state) of the cruise control switch 102 for interrupting the constant speed travel control, is set to be smaller than the above predetermined stroke (the predetermined amount or distance), which is required to turn on the brake switch 101. In FIG. 10, the brake switch 101 is a limit switch, and the cruise control switch 102 is also a limit switch.

As shown in FIG. 11, a detection signal (B), which shows the conducting state of the cruise control switch 102, is supplied to the input/output device 54 through a backflow prevention diode 101D, an input impedance adjusting resistor 101K and a pull down resistor 101R. As shown in FIG. 10, when the brake pedal 201 is depressed, the cruise control switch (brake-coupled sensor) 102 is urged first (thereby being placed in the non-conducting state) at a relatively small stroke. Then, when the brake pedal 201 is further depressed, the brake switch 101 is urged next (thereby being placed in the conducting state) at the predetermined stroke. As discussed above, even in the case where the negative pressure of the brake booster 207 leaks to cause an increase in the required depression force for depressing the brake pedal 201, and thereby the brake pedal 201 cannot be depressed to the predetermined depression stroke, the engine start through the normal time push operation is still possible as long as the brake pedal 201 can be depressed to the corresponding position, at which the cruise control switch (the brake-coupled sensor) 102 is urged, i.e., is depressed. This state is different from the normal situation in the following point. That is, the brake switch 101 is placed in the unurged state (the detection signal A indicating the non-conducting state). More specifically, the brake sensor 101 does not detect the depression of the brake pedal 201, and the brake-coupled sensor 102 is placed in the detected state, in which the depression of the brake pedal 201 is detected by the brake-coupled sensor 102. Thus, the operational history of this case is stored as the diagnostic data in the diagnostic data memory 53b (FIG. 1).

There is the other case where the brake pedal 201 is depressed all the way to the urging position for urging the brake switch 101, but the brake switch 101 fails due to, for example, the breaking of the wiring or of the fuse or the electrical contact failure. Thus, the brake switch 101 is kept in the non-conducting state. In this instance, when the cruise control switch (the brake-coupled sensor) 102 is normal and outputs the urged state information (the detection signal B indicating the non-conducting state), the engine start is enabled through the normal time push operation based on the urged state information of the cruise control switch (brake-coupled sensor) 102. In this case too, the detection signal A indicates the non-conducting state. Thus, the operational history of this case is also stored as the diagnostic data in the diagnostic data memory 53b (FIG. 1).

Now, the operation of the engine start control system 1 will be described with reference to a flowchart.

Figure 3:
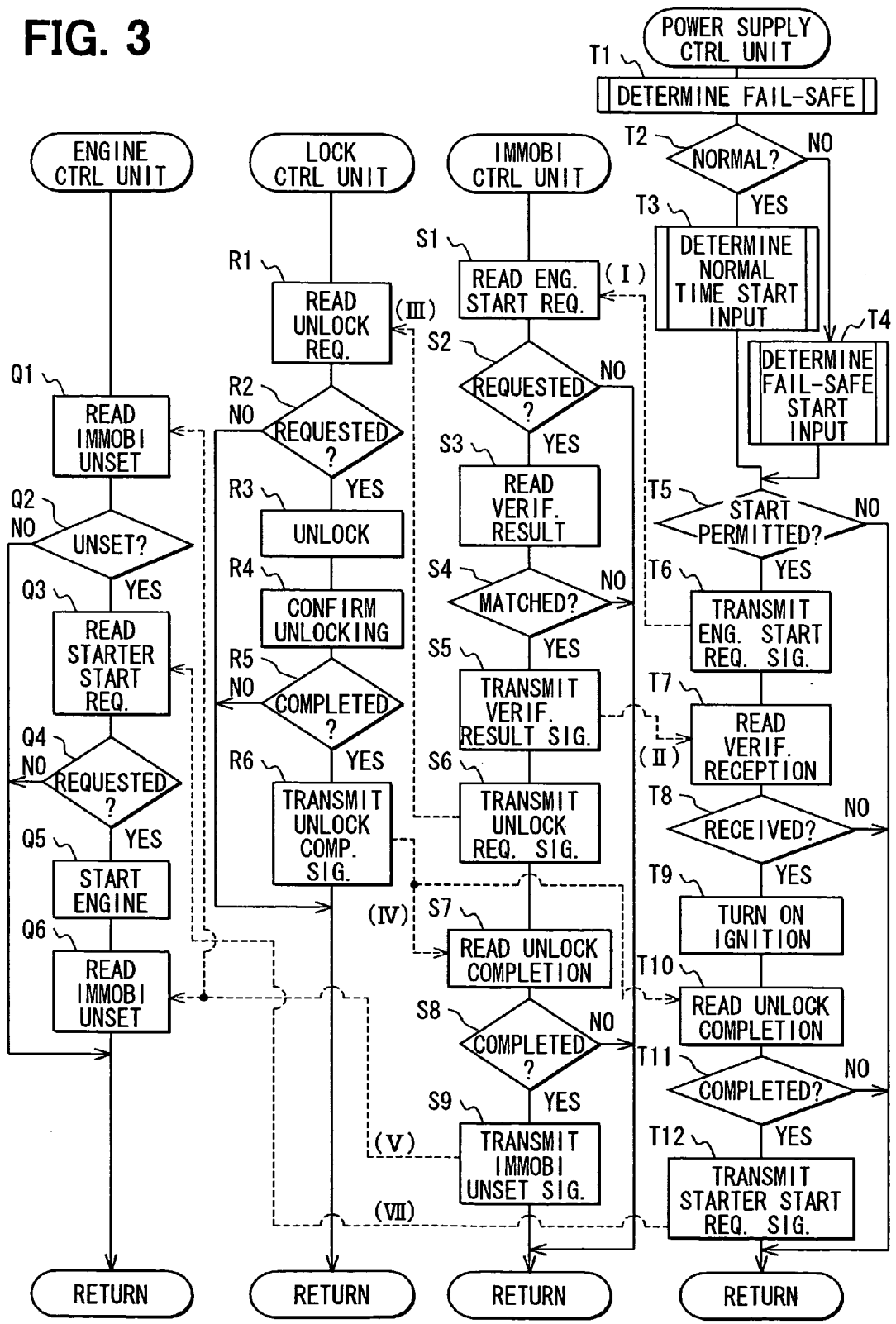
FIG. 3 is a flowchart showing an exemplary flow of a control operation of the system of FIG. 1.

FIG. 3 shows an operational flow of the entire system. The power supply control unit 13 makes a fail-safe determination (determining whether the current operational mode is the fail-safe mode) based on the depression detected state of the brake pedal 201 at step T1. Then, at step T2, it is determined whether the determination result made at step T1 is indicated as normal (not in the fail-safe mode). When it is determined that the determination result is indicated as normal at step T2, control proceeds to step T3. At step T3, a normal time start input determination is made (the normal mode). In contrast, when it is determined that the determination result is abnormal at step T2, control proceeds to step T4. At step T4, a fail-safe start input determination is made (the fail-safe mode).

Figure 4:
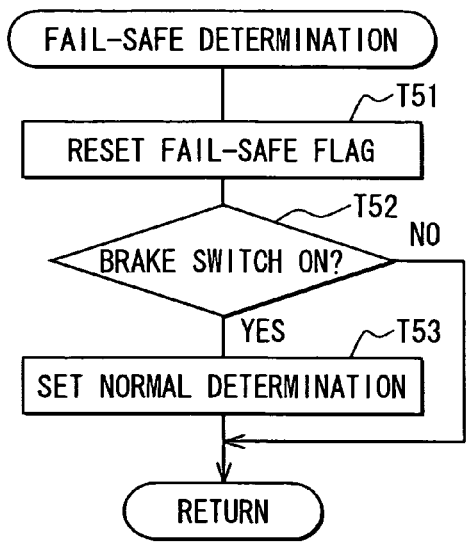
FIG. 4 is a flowchart showing a first example of a fail-safe determination process.

FIG. 4 shows an example of the fail-safe determination process in the case where the input from the brake-coupled switch 102 is not used. At step T51, the fail-safe flag is reset. The fail-safe flag is set to be 1 in the case of receiving the normal determination result (i.e., the result indicating the normal). Also, the fail-safe flag is set to be 0 (zero) in the case of receiving the abnormal determination result (i.e., the result indicating the abnormal). Furthermore, the fail-safe flag is set to be 0 (zero) upon the resetting of the fail-safe flag. At step T52, it is determined whether the brake switch 101 is urged (the brake switch 101 being placed in the conducting state, i.e., being ON). In other words, it is determined whether the detection signal A is high (Hi) in FIG. 11. When it is determined that the brake switch 101 is urged at step T52, control proceeds to step T53. At step T53, the fail-safe flag is set to reflect the normal determination result and is thereby set to 1. In contrast, when it is determined that the brake switch 101 is not urged at step T52, control skips step T53, and the fail-safe flag is kept in the reset state, i.e., the fail-safe flag is set to reflect the abnormal determination result and is thereby set to 0.

Figure 5:
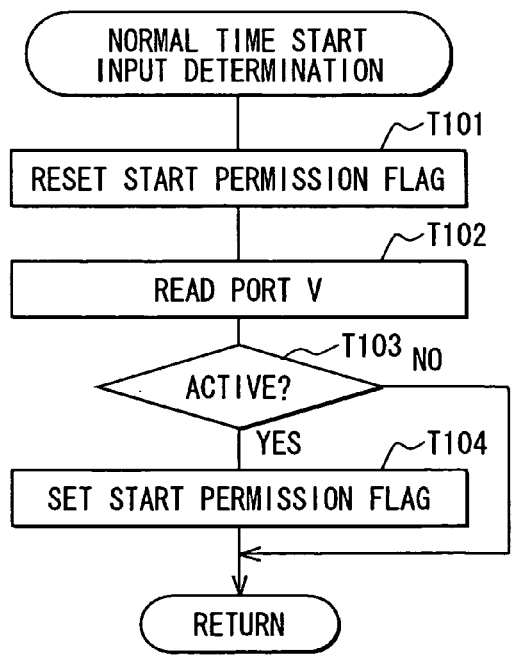
FIG. 5 is a flowchart showing a normal time start input determination process.

FIG. 5 shows the process of the normal time start input determination (the normal mode). First, a start permission flag is reset at step T101, and then the input of the port V (FIG. 1) is read at step T102. In a start permissible state (a state of permitting the engine start), the start permission flag is set to be 1. In contrast, in a nonpermissible state (a state of not permitting the engine start), the start permission flag is set to be 0 (zero). Also, the start permission flag is set to be 0 (zero) upon the resetting of the fail-safe flag. At step T103, it is determined whether the input of the port V is active. When the push switch 21 is depressed normally, the input of the port V is active. Thus, control proceeds from step T103 to step T104 where the start permissible state is reflected into the start permission flag, so that the start permission flag is set to 1. In contrast, when it is determined that the input of the port V is not active, i.e., when it is determined that the push switch 21 is not depressed (i.e., urged) at step T103, control skips step T104. Thus, the start permission flag is kept in the reset state, i.e., the start permission flag is placed in the start nonpermissible state and is thereby set to 0.

Figure 6:
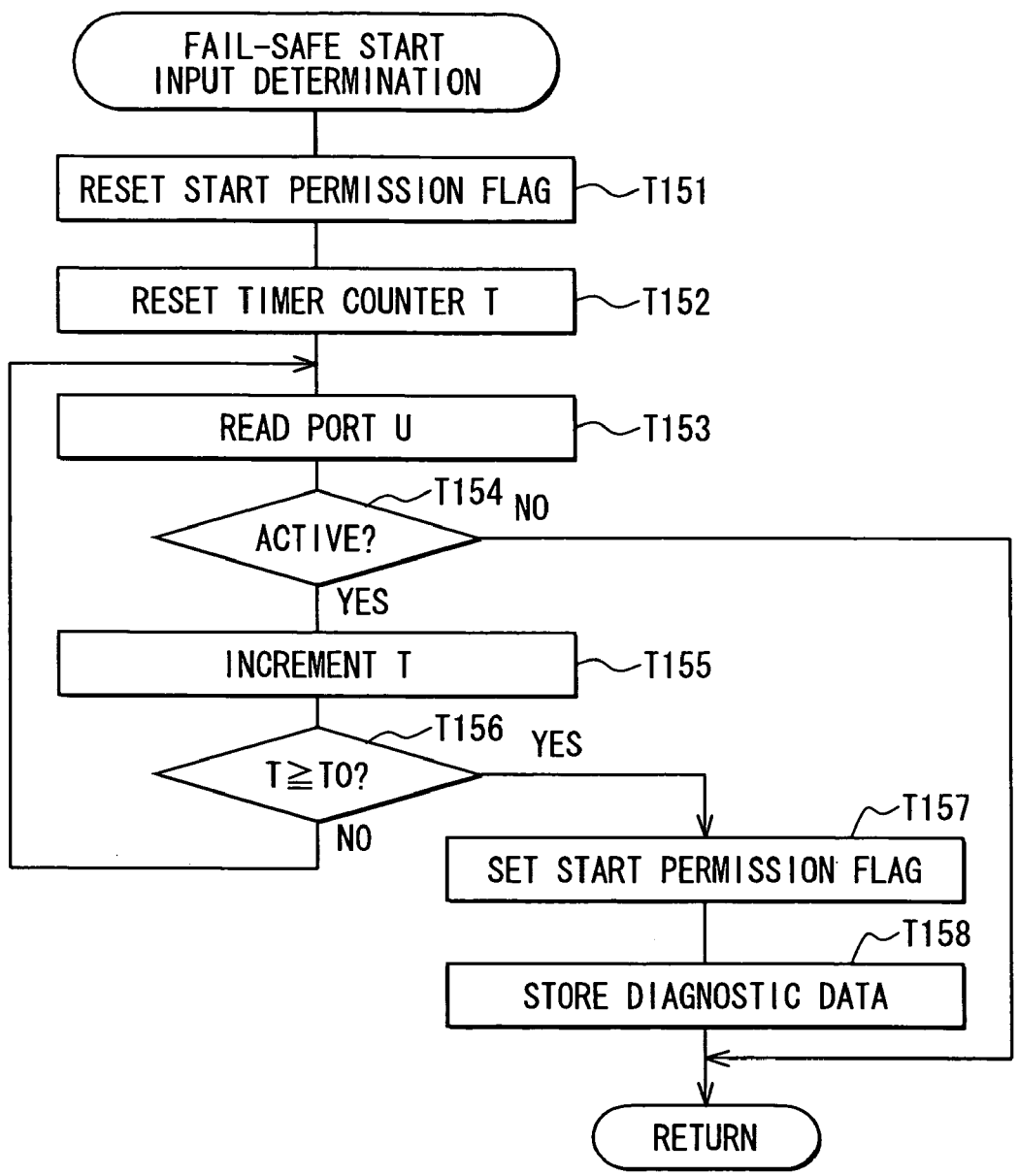
FIG. 6 is a flowchart showing a first example of a fail-safe start input determination process.

FIG. 6 shows the operational flow of the fail-safe start input determination (the fail-safe mode). In this instance, the fail-safe push operation is the long period depression like one shown in FIG. 2A. The start permission flag is reset at step T151, and a timer counter T, which measures the duration of the long period depression, is reset at step T152. Then, at step T153, the port U (FIG. 1) is read. At step S154, it is determined whether the input of the port U is active. When the depression of the push switch 21 is continued, the input of the port U is active, so that control proceeds from step T154 to step T155 where a value of the timer counter T is incremented. This is repeated until the value of the timer counter T reaches a predetermined count value T0, which corresponds to the end of the predetermined duration of the long period depression. When the predetermined count value T0 is reached, control proceeds to step T157. At step T157, the start permission flag is set to the start permissible state, i.e., is set to 1. Then, at step T158, the diagnostic data, which indicates that the engine 16 is started under the fail-safe mode, is stored in the diagnostic data memory 53b (FIG. 1). In contrast, when the depression of the push switch 21 is released before reaching the end of the predetermined duration of the long period depression, control skips steps T157, T158 and terminates the operation at step T154.

Figure 7:
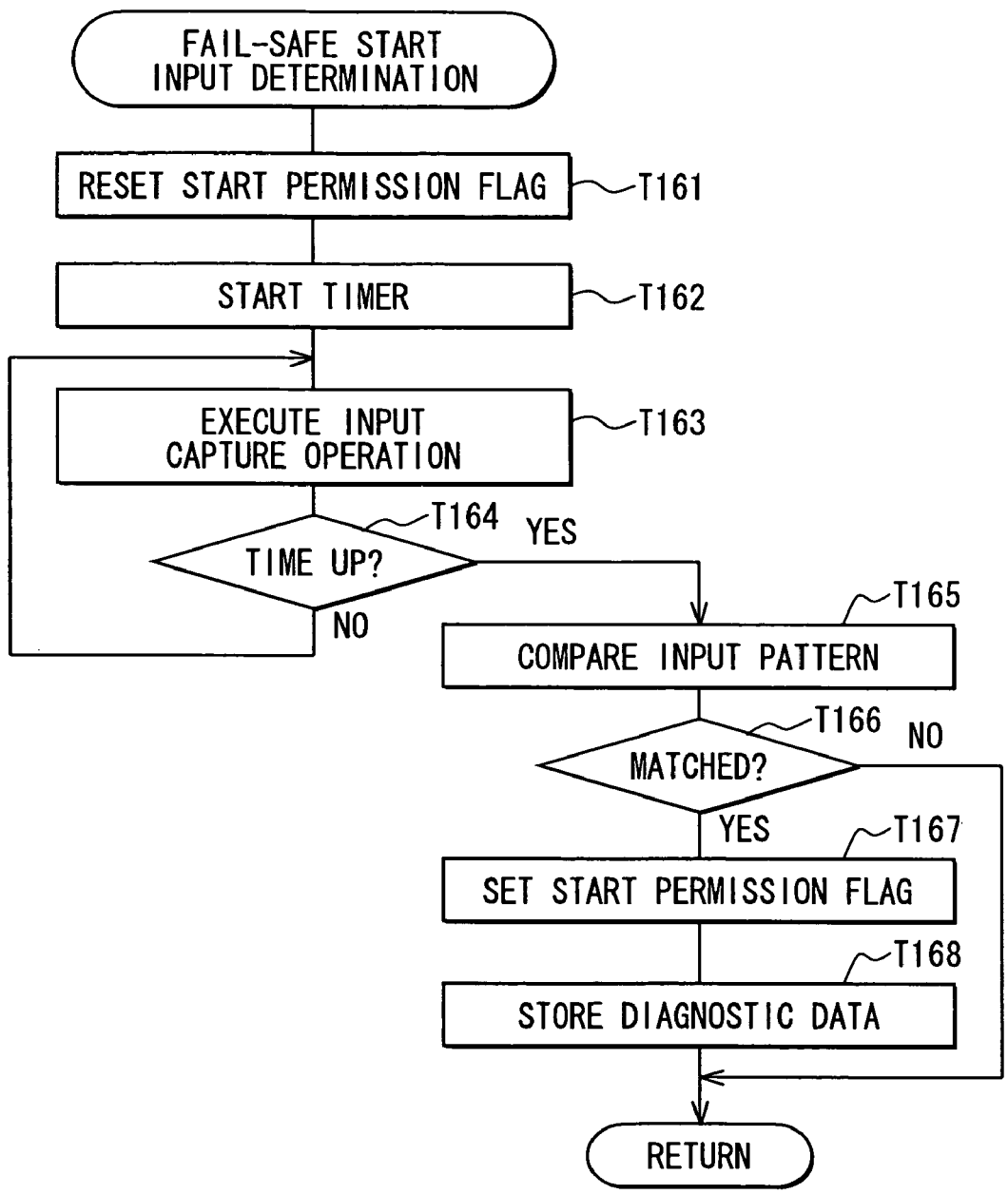
FIG. 7 is a flowchart showing a second example of a fail-safe start input determination process.

FIG. 7 shows the operational flow of the fail-safe start input determination (the fail-safe mode) in the case where the fail-safe push operation is made in the depression pattern of the push switch 21 like one shown in FIG. 2B. First, the start permission flag is reset at step T161, and then a timer, which measures an input permissible period of the push switch 21, is started at step T162. Then, at step T163, control executes an input capture operation for capturing, i.e., for obtaining the input from the push switch 21 at the port U (FIG. 1). Then, at step T164, it is determined whether the input permissible period is ended (time up). When it is determined that the input permissible period is ended at step T164, control proceeds to step T165. At step T165, the captured input pattern, which is captured at step T163, is compared with a preregistered master pattern. At step T166, it is determined whether the captured input pattern matches with the preregistered master pattern. When it is determined that the captured input pattern coincides with the preregistered master pattern, the start permission flag is set to the start permissible state, i.e., is set to 1. Then, at step T168, the diagnostic data, which indicates the engine 16 is started under the fail-safe mode, is stored in the diagnostic data memory 53b (FIG. 1). When it is determined that the captured input pattern does not match with the preregistered master pattern, control skips steps T167, T168.

Figure 8:
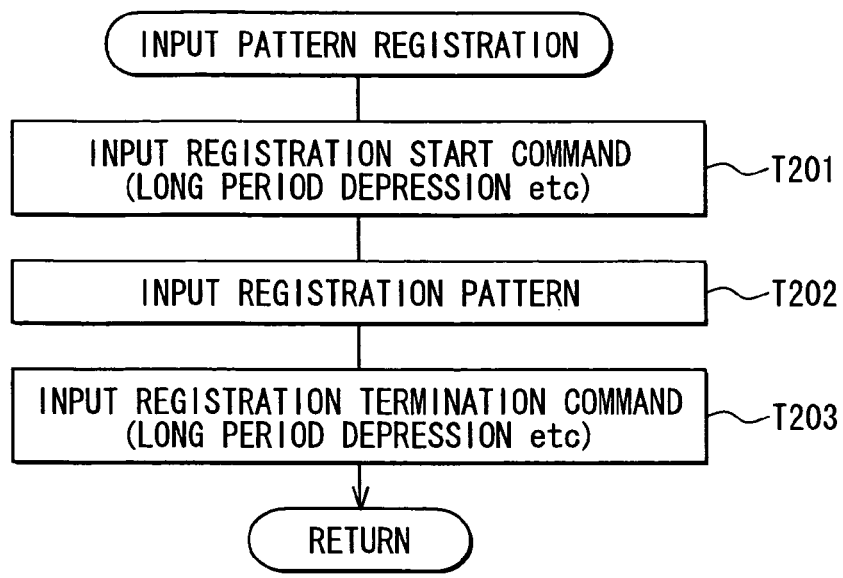
FIG. 8 is a flowchart showing a registration process of a master pattern corresponding to FIG. 7.

Any desirable pattern can be registered as the master pattern through use of push switch 21. In this case, an input for shifting the operational mode to a registration mode, needs to be made. This input for shifting the operational mode to the registration mode may be made through use of the push switch 21. FIG. 8 shows an exemplary procedure of this registration process. Specifically, at step T201, the input for shifting to the registration mode is made, that is a registration start command is inputted by pressing the push switch 21 for a predetermined period or longer. At this time, a notification, which notifies the user that the operational mode is shifted to the registration mode, may be provided to the user through, for example, audible notification (e.g., alarm sound) and/or visible notification (e.g., lighting, display message or sign). Next, at step T202, the desirable master pattern is inputted through use of the push switch 21 to register the master pattern. Upon completion of the registration of the master pattern, the push switch 21 may be pressed for the predetermined period or longer once again as an input for terminating the registration mode (inputting a registration termination command) at step T203.

Figure 9:
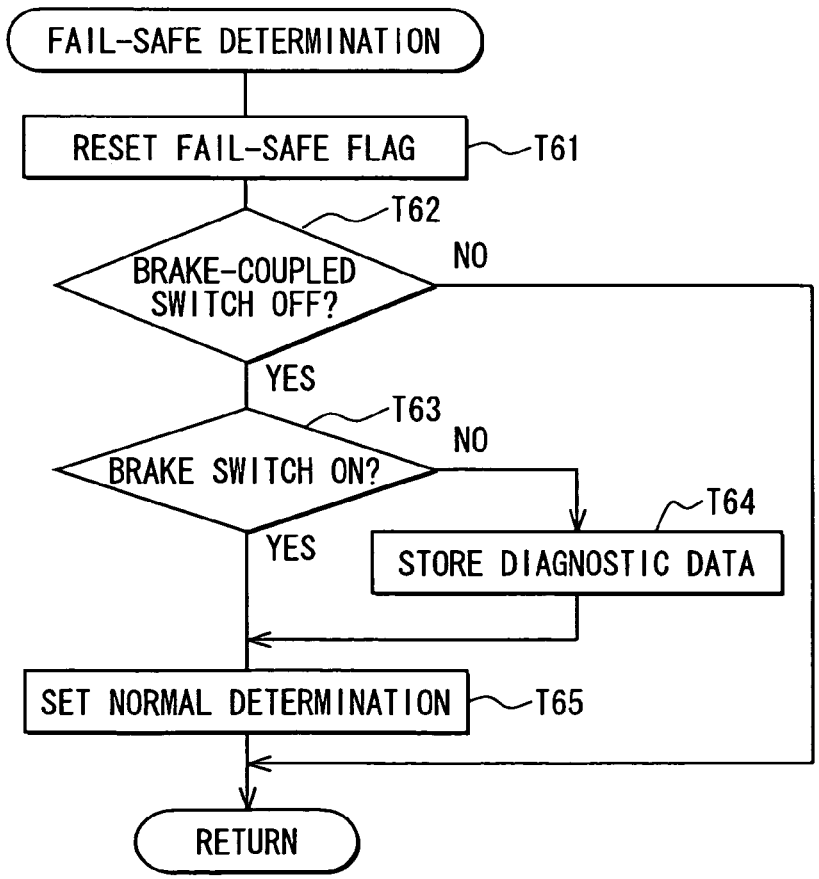
FIG. 9 is a flowchart showing a second example of the fail-safe determination process.

FIG. 9 shows an operational flow for performing the fail-safe determination through use of the brake-coupled switch (specifically, the cruise control switch) 102. At step T61, the fail-safe flag is reset. At step T62, it is determined whether the brake-coupled switch 102 is urged (in the non-conducting state, i.e., OFF, and thereby the detection signal B being Lo in FIG. 11). When it is determined that the brake-coupled switch 102 is urged at step T62, control proceeds to step T63. At step T63, it is determined whether the brake switch 101 is urged (in the conducting state, i.e., ON). When it is determined that the brake switch 101 is urged at step T63, control proceeds to step T65. At step T65, the fail-safe flag is set to reflect the normal determination result and is thereby set to 1. In contrast, when it is determined that the brake switch 101 is not urged at step T63, only the brake-coupled switch 102 is urged, so that control proceeds to step T64. At step T64, the diagnostic data is recorded, and thereafter control proceeds to step T65. At step T65, the fail-safe flag is set to reflect the normal determination result and is thereby set to 1. Furthermore, when it is determined that the brake-coupled switch 102 is also not urged at step T62, control skips step 63 and the following steps, and the fail-safe flag is kept to reflect the reset state, i.e., to reflect the abnormal determination and is thereby set to 0.

Now, the description returns to FIG. 3. When the start permission flag is set to 1 (the start permissible state) at step T5 under any one of the normal mode and the fail-safe mode, the engine start control process will be followed. First, at step T6, an engine start request signal (I) is transferred to the immobilization control unit 5. In turn, the immobilization control unit 5 receives the engine start request signal (I) at steps S1, S2 and verifies whether the authentication ID of the portable radio communication device 2 matches with the master ID registered in the vehicle 3 at steps S3, S4. When it is determined that the authentication ID of the portable radio communication device 2 matches with the master ID (i.e., at the time of reception of the authentication), the immobilization control unit 5 outputs a verification result signal (II) to the power supply control unit 13 at step S5. The immobilization control unit 5 transmits an unlock request signal (III) to the lock control unit 10 at step S6. When the lock control unit 10 receives the unlock request signal (III) at steps R1, R2, the lock control unit 10 unlocks the steering lock mechanism 12 by driving the steering lock motor 11 at step R3. Then, when the lock control unit 10 confirms the unlocking of the steering lock mechanism 12 at steps R4, R5, the lock control unit 10 transmits an unlock completion signal (IV) to the immobilization control unit 5 and the power supply control unit 13 at step R6. Furthermore, although not clearly illustrated in the flowchart of FIG. 3, when the power supply control unit 13 receives the verification result signal (II), the power supply control unit 13 outputs an ignition signal (VI) to activates an ignition (IG).

When the immobilization control unit 5 receives the unlock completion signal (IV) at steps S7, S8, the immobilization control unit 5 unsets the immobilization by activating an engine operation disabling signal (V). Here, when the engine operation disabling signal (V) is activated, the immobilization is unset (i.e., in the state where a prohibition release command is outputted). In contrast, when the engine operation disabling signal (V) is deactivated, the immobilization is set (i.e., in the state where a prohibition setting command is outputted). Also, the power supply control unit 13 receives the unlock completion signal (IV) at steps T10, T11 and, in turn, transmits a starter start request signal (VII) at step T12.

In the initial state, the engine control unit 14 monitors the state of the engine operation disabling signal (V). The engine control unit 14 is placed in a standby state until the immobilization is unset (i.e., in the state where a prohibition release command is outputted) at steps Q1, Q2. Then, when the immobilization is unset, the engine control unit 14 reads the starter start request signal (VII) at steps Q3, Q4. When the starter start request signal (VII) is in the active state, the engine control unit 14 determines that the engine start condition is satisfied and starts the engine 16 at step Q5.

Additional advantages and modifications will readily occur to those skilled in the art. The invention in its broader terms is therefore not limited to the specific details, representative apparatus, and illustrative examples shown and described.

What is claimed is:

1. An engine start control system for an internal combustion engine of a vehicle, comprising:
    a push switch that is pressable by a user to start the engine;
    a brake sensor that senses depression of a brake pedal of the vehicle when the user depresses the brake pedal a predetermined distance or greater from an initial point; and
    an engine start control unit that controls engine start of the engine, wherein:
    the engine start control unit determines that a current operational mode is a normal mode when the brake sensor detects the depression of the brake pedal and is thereby placed in an detected state;
    the engine start control unit enables the engine start when the user performs a predetermined normal time push operation on the push switch in the normal mode;
    the engine start control unit determines that the current operational mode is a fail-safe mode when the brake sensor does not detect the depression of the brake pedal and is thereby placed in an undetected state;
    the engine start control unit enables the engine start when the user performs a predetermined fail-safe push operation on the push switch in the fail-safe mode; and
    the fail-safe push operation of the push switch requires an increased work load of the user in comparison to that of the normal time push operation of the push switch.

2. The engine start control system according to claim 1, wherein:
    the vehicle includes a brake booster, which amplifies a depression force applied from the user onto the brake pedal through use of a negative suction pressure of the engine and conducts the increased depression force to a master cylinder; and
    the engine start control unit enables the engine start when the user performs the fail-safe push operation on the push switch in the undetected state of the brake sensor, which results from shortage of the depression force of the user for depressing the brake pedal to the predetermined distance because of a reduction in an assist force of the brake booster that is causes by leakage of a remaining negative pressure of the brake booster in a stop state of the engine.

3. The engine start control system according to claim 1, wherein the engine start control unit enables the engines start when the user performs the fail-safe push operation on the push switch in the undetected state of the brake sensor, which occurs although the brake pedal is depressed the predetermined distance due to a malfunction of the brake sensor.

4. The engine start control system according to claim 3, wherein:
    the brake sensor is a brake switch, which is operated at time of depressing the brake pedal to lit a stop lamp of the vehicle; and
    the engine start control unit enables the engine start when the user performs the fail-safe push operation on the push switch in the undetected state of the brake switch, which results from one of:
    breaking of a wiring path of the brake switch; and
    breaking of a fuse, which is installed in the wiring path of the brake switch.

5. The engine start control system according to claim 1, wherein:
    the push switch includes a plurality of sub-switches, each of which is constructed such that a depressed state and a non-depressed state of the sub-switch correspond to a conducting state and a non-conducting state of the sub-switch;
    under the normal mode, the engine start control unit enables the engine start when at least one of the plurality of sub-switches is placed in the conducting state, which indicates the depressed state; and
    under the fail-safe mode, the engine start control unit enables the engine start only when all of the plurality of sub-switches are placed in the conducting state, which indicates the depressed state.

6. The engine start control system according to claim 1, further comprising a diagnostic data storage, which stores a history of the fail-safe push operation as diagnostic data under the fail-safe mode.

7. The engine start control system according to claim 1, wherein:
    under the fail-safe mode, the engine start control unit enables the engine start when the push switch is continuously held in a depressed state for a predetermined period as the fail-safe push operation; and
    under the normal mode, the engine start control unit enables the engine start when the push switch is depressed less than the predetermined period.

8. The engine start control system according to claim 1, wherein under the fail-safe mode, the engine start control unit enables the engine start when the fail-safe push operation is performed on the push switch in a form of a patterned depression operation that implements a predetermined pattern of a depressed period and a non-depressed period of the push switch.

9. The engine start control system according to claim 8, wherein:
    under the normal mode, the engine start control unit enables the engine start when the normal time push operation is performed on the push switch in a form of a single depression operation, in which the push switch is depressed a single time; and
    under the fail-safe mode, the engine start control unit enables the engine start when the fail-safe push operation is performed on the push switch in a form of a repeated multiple depression operation, in which the push switch is repeatedly operated a predetermined number of times.

10. The engine start control system according to claim 9, wherein the fail-safe push operation is executed by alternately implementing:
    a repeatedly operating period for repeatedly operating the push switch the predetermined number of times; and a non-operating period, which is longer than an interval between the operations of the push switch in the repeatedly operating period.

11. The engine start control system according to claim 1, further comprising a brake-coupled sensor, which detects depression of the brake pedal through a different sensing line that is different from that of the brake sensor when the brake pedal is depressed a preset distance from the initial point, wherein even in the undetected state of the brake sensor, when the brake-coupled sensor senses the depression of the brake pedal, the engine start control unit enables the engine start upon execution of the normal time push operation on the push switch.

12. The engine start control system according to claim 11, further comprising a diagnostic data storage, which stores a history of the normal time push operation as diagnostic data when the engine start is enabled by the engine start control unit upon execution of the normal time push operation in a detected state of the brake-coupled sensor where the brake-coupled sensor detects the depression of the brake pedal although the brake sensor is in the undetected state.

13. The engine start control system according to claim 11, wherein the preset distance of the brake pedal, at which the depression of the brake pedal is detected by the brake-coupled sensor, is smaller than the predetermined distance of the brake pedal, at which the depression of the brake pedal is detected by the brake sensor.

* * * * *